(12) United States Patent
Wilkie

(10) Patent No.: US 6,677,029 B2
(45) Date of Patent: Jan. 13, 2004

(54) HOLOGRAPHIC FILMS

(75) Inventor: Andrew F. Wilkie, Avondale, PA (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 21 days.

(21) Appl. No.: 09/741,116

(22) Filed: Dec. 20, 2000

(65) Prior Publication Data

US 2001/0049004 A1 Dec. 6, 2001

Related U.S. Application Data

(60) Provisional application No. 60/172,837, filed on Dec. 20, 1999.

(51) Int. Cl.[7] .......................... B32B 3/00; B32B 15/08; B32B 27/32
(52) U.S. Cl. ....................... 428/172; 428/336; 428/461; 428/516
(58) Field of Search ............................. 428/215, 216, 428/220, 336, 172, 461, 516

(56) References Cited

U.S. PATENT DOCUMENTS

| 3,973,063 | A | 8/1976 | Clayton ................... 428/35.2 |
|---|---|---|---|
| 4,413,109 | A | 11/1983 | Haas ....................... 526/348 |
| 4,870,122 | A | 9/1989 | Lu .......................... 524/488 |
| 4,961,992 | A | 10/1990 | Balloni et al. ............. 428/332 |
| 5,108,814 | A | 4/1992 | Harp et al. ................ 428/156 |
| 5,194,318 | A | 3/1993 | Migliorini et al. .......... 428/215 |
| 5,254,394 | A | 10/1993 | Bothe et al. ............... 428/212 |
| 5,501,905 | A | 3/1996 | Krallmann et al. .......... 428/339 |
| 5,616,420 | A | 4/1997 | Yamaoka et al. |
| 5,662,986 | A | 9/1997 | Stepanek |
| 5,723,203 | A | 3/1998 | Stepanek |
| 5,735,989 | A | 4/1998 | Stepanek |
| 5,746,865 | A | 5/1998 | Stepanek |
| 5,766,734 | A | 6/1998 | Stepanek |
| 5,871,608 | A | 2/1999 | Stepanek |
| 5,879,028 | A | 3/1999 | Benoit |
| 5,900,095 | A | 5/1999 | Stepanek |
| 5,902,436 | A | 5/1999 | Stepanek |
| 6,391,425 | B1 | 5/2002 | Migliorini et al. .......... 428/172 |

FOREIGN PATENT DOCUMENTS

| EP | 0767210 | 4/1997 |
|---|---|---|
| WO | WO 9600146 | 1/1996 |
| WO | WO 0058090 | 10/2000 |

*Primary Examiner*—D. S. Nakarani
(74) *Attorney, Agent, or Firm*—Caesar, Rivise, Bernstein, Cohen & Pokotilow, Ltd.

(57) ABSTRACT

A multilayer holographic film including a core layer and a hologram-receiving layer having a lower melting point than said core layer on at least one side of the core layer for including an embossed, holographic image therein and being adapted to receive a metal layer thereon, said hologram-receiving layer(s) include(s) a butene-propylene random copolymer having a melting point in the range of between about 125° C. and about 145° C. and blends thereof; a metallocene catalyzed, isotactic C2/C3 random copolymer with a C2 content of at least about 2% having a melting point in the range of between about 120° C. and about 140° C. and blends thereof or a high density polyethylene homopolymer having a melting point in the range of between about 120° C. and about 130° C. and blends thereof.

32 Claims, No Drawings

HOLOGRAPHIC FILMS

RELATED APPLICATION

This is a utility application based upon provisional application Ser. No. 60/172,837, filed on Dec. 20, 1999, entitled HOLOGRAPHIC FILMS. Applicant hereby claims the benefit of the filing date of the '837 provisional application for this utility application.

FIELD OF THE INVENTION

This invention relates to unique holographic films, and in particular to unique holographic films that receive a holographic image, in the form of an embossed image, that is imparted to a subsequently applied metallized layer. In the preferred embodiments of the invention the metallized layer is a permanent layer of the film, and in other embodiments the metallized layer is transferable from the film to another substrate.

BACKGROUND OF THE INVENTION

Holographic films including metallized layers are known in the art, and are utilized for a wide variety of applications, e.g., flexible packaging substrates for food products, gift wrapping paper, and as a decorative component in non-flexible packages or rigid packages, e.g., packages for tubes of toothpaste, cereal boxes, detergent boxes, etc. For many applications, and in particular in the packaging of food products, it is desirable that these metallized films have good oxygen and moisture barrier properties.

An exemplary, commercially available transparent holographic film includes a Ziegler-Natta catalyzed propylene-ethylene copolymer (3–7% ethylene) outer layer for receiving an embossed holographic pattern therein. The gloss of this film, prior to receiving the metallized layer thereon, is approximately 110 units when measured at a 20° angle employing ASTM D2457-97. Although an outer layer formed of 100% Ziegler-Natta catalyzed or metallocene catalyzed isotactic polypropylene homopolymer has the desired gloss (e.g., on the order of 135 to 140 gloss units as measured at a 20° angle employing ASTM D2457-97) this polymer has a melting point that is too high to permit its effective use in the holographic films of this invention.

The art of transferring a holographic image from one substrate to another also is known, as is disclosed in copending application Ser. No. 09/627,977, filed on Jul. 28, 2000, now U.S. Pat. No. 6,558,788 B1 titled Holographic Transfer Films and identifying Michael D. Butler and Shailesh Chunilal Patel as joint inventors. In addition holographic transfer films for receiving a metallized layer thereon for subsequent transfer to another substrate are known in the art, as exemplified in U.S. Pat. Nos. 5,662,986; 5,735,989; 5,723,203; 5,746,865; 5,766,734; 5,871,608; 5,900,095 and 5,902,436. The subject matter of the above-identified '977 application and of all of the above-identified patents is incorporated herein by reference.

While holographic films presently are commercially available, a need exists for improved holographic films having a metallized layer with enhanced brightness and sharper and crisper holographic images therein. It is to such holographic films that the present invention relates.

SUMMARY OF THE INVENTION

The above and other objects of this invention are achieved in a multilayer (e.g., two or more layers) holographic film including a core layer, preferably comprising polypropylene, and at least one hologram-receiving layer on at least one side of said core layer, and preferably adhered to at least one surface of the core layer for including an embossed, holographic image therein and being adapted to receive a metal layer thereon, said hologram-receiving layer(s) comprising a butene-propylene random copolymer having a melting point in the range of between about 125° C. and about 145° C. Most preferably an embossed, holographic image is provided in the hologram-receiving layer(s) and a metal layer is provided on the embossed hologram-receiving layer(s) so as to include an image therein conforming to the embossed holographic image in said hologram-receiving layer(s).

Although it is within the scope of this invention to provide hologram-receiving layers on opposed sides of the core layer, in the most preferred embodiments of the invention a hologram-receiving layer is provided on only one side of a core layer of the multilayer films. Therefore, throughout the remainder of this specification, the most preferred multilayer films of this invention will be described, wherein only a single hologram-receiving layer is provided. However, it should be understood that within the broadest aspects of this invention, each of the disclosed hologram-receiving layers can be on opposed sides of the core of the multilayer film.

In a preferred embodiment of the invention, the hologram-receiving layer comprises at least about 25%, by weight, of a butene-propylene random copolymer containing more than 8%, by weight butene therein.

In another preferred embodiment of the invention the hologram-receiving layer comprises at least about 50%, by weight, of a butene-propylene random copolymer containing more than 8%, by weight butene therein.

In another preferred embodiment of the invention the hologram-receiving layer comprises substantially 100%, by weight, of a butene-propylene random copolymer containing more than 8%, by weight butene therein.

Most preferably the butene-propylene random copolymer employed in this invention includes a percentage of butene, by weight, in the range of about 8% to about 16%. Most preferably the percentage of butene, by weight, is about 14%.

In the preferred embodiments of this invention, the thickness of the hologram-receiving layer should be greater than the depth of the embossed holographic image. Preferably the thickness should be at least 2 gauge; more preferably in the range of 2 gauge to 8 gauge; even more preferably in the range of 4 gauge to 8 gauge and most preferably approximately 6.5 gauge.

In accordance with certain preferred embodiments of the invention, said hologram-receiving layer includes a metallocene catalyzed, isotactic C2/C3 random copolymer with a C2 content of at least about 2% blended with a butene-propylene random copolymer containing more than 8%, by weight butene therein.

In accordance with certain preferred embodiments of the invention, the hologram-receiving layer includes approximately 50%, by weight, of the metallocene catalyzed, isotactic C2/C3 random copolymer with a C2 content of at least about 2% and approximately 50%, by weight, of the butene-propylene random copolymer containing more than 8%, by weight butene therein.

In accordance with certain preferred embodiments of the invention the hologram-receiving layer includes a metallocene catalyzed, isotactic C3 homopolymer blended with a butene-propylene random copolymer containing more than 8%, by weight, butene therein. In certain embodiments the metallocene catalyzed, isotactic C3 homopolymer constitutes approximately 50%, by weight, of the blend and said butene-propylene random copolymer containing more than 8%, by weight butene therein constitutes approximately 50%, by weight of the blend.

In certain preferred embodiments of the invention the hologram-receiving layer includes a metallocene catalyzed, isotactic C3 homopolymer blended with a metallocene catalyzed, isotactic C2/C3 random copolymer with a C2 content of at least about 2% and with a butene-propylene random copolymer containing more than 8%, by weight butene therein. In certain preferred embodiments the metallocene catalyzed, isotactic C3 homopolymer constitutes approximately 50%, by weight, of the blend, the metallocene catalyzed, isotactic C2/C3 random copolymer with a C2 content of at least about 2% constitutes approximately 25%, by weight of the blend and the butene-propylene random copolymer containing more than 8%, by weight butene therein constitutes approximately 25%, by weight of the blend.

In accordance with another embodiment of this invention a multilayer holographic film includes a core layer comprising polypropylene and a hologram-receiving layer adhered to one surface of the core layer for including an embossed, holographic image therein and being adapted to receive a metal layer thereon, said hologram-receiving layer comprising a metallocene catalyzed, isotactic C2/C3 random copolymer with a C2 content of at least about 2% having a melting point in the range of between about 120° C. and about 140° C. Most preferably the hologram-receiving layer includes an embossed, holographic image therein and a metal layer on the embossed hologram-receiving layer includes an image therein conforming to the embossed holographic image in said hologram-receiving layer.

In a preferred embodiment of the invention, the hologram-receiving layer comprises at least about 25%, by weight, of the metallocene catalyzed, isotactic C2/C3 random copolymer with a C2 content of at least about 2%.

In another preferred embodiment of the invention, the hologram-receiving layer comprises at least about 50%, by weight, of the metallocene catalyzed, isotactic C2/C3 random copolymer with a C2 content of at least about 2%.

In another preferred embodiment of the invention, the hologram-receiving layer comprises substantially 100%, by weight, of the metallocene catalyzed, isotactic C2/C3 random copolymer with a C2 content of at least about 2%.

In another preferred embodiment of the invention the hologram-receiving layer includes a metallocene catalyzed, isotactic C3 homopolymer blended with a metallocene catalyzed, isotactic C2/C3 random copolymer with a C2 content of at least about 2%. In one preferred embodiment the metallocene catalyzed, isotactic C3 homopolymer constitutes approximately 50%, by weight, of the blend and the metallocene catalyzed, isotactic C2/C3 random copolymer with a C2 content of at least about 2% constitutes approximately 50%, by weight of the blend.

In accordance with all embodiments of the invention the thickness of the hologram-receiving layer is at least 2 gauge; more preferably in the range of 2 gauge to 8 gauge; even more preferably in the range of 4 gauge to 8 gauge and most preferably approximately 6.5 gauge.

In accordance with another embodiment of the invention, a multilayer holographic film includes a core layer comprising polypropylene and a hologram-receiving layer adhered to one surface of the core layer for including an embossed, holographic image therein and being adapted to receive a metal layer thereon, said hologram-receiving layer being untreated and comprising a high density polyethylene having a melting point in the range of between about 120° C. and about 135° C. Reference throughout this application to "high density polyethylene" refers to a polymer having a density of at least 0.935 gms/cc. Most preferably an embossed, holographic image is provided in the hologram-receiving layer and a metal layer on the embossed hologram-receiving layer includes an image therein conforming to the embossed holographic image in said hologram-receiving layer.

In certain embodiments of the invention the high density polyethylene constitutes in excess of 40%, by weight, of the hologram-receiving layer.

In certain embodiments of the invention, the high density polyethylene constitutes at least 50%, by weight, of the hologram-receiving layer.

In certain embodiments of the invention the high density polyethylene constitutes approximately 100%, by weight, of the hologram-receiving layer.

In accordance with the broadest aspect of this invention, the high density polyethylene can be either a homopolymer or a copolymer.

In certain embodiments of the invention a terpolymer of ethylene-propylene-diene monomer is blended with said high density polyethylene in the hologram-receiving layer. In certain preferred embodiments the high density polyethylene and the terpolymer are present in substantially equal weight percentages.

In all embodiments of this invention the film can include a slip layer adhered to the surface of the core opposite the surface to which the hologram-receiving layer is attached. Preferably the slip layer includes predominantly a polypropylene homopolymer and a substantially non-migratory slip agent in said homopolymer. A preferred slip agent for use in the invention is a cross-linked silicone present in an amount of no more than 2500 ppm.

In all embodiments of the invention it is preferred that the film be substantially free of migratory ingredients and also free of additives that degrade the embossed, holographic image.

In the preferred embodiments of the invention the core layer is polypropylene, and most preferably is a member selected from the group of metallocene catalyzed isotactic polypropylene homopolymers, Ziegler-Natta catalyzed isotactic polypropylene homopolymers, propylene/ethylene random copolymers (either Ziegler-Natta or metallocene catalyzed), high crystalline polypropylene homopolymers, blends of two or more of said homopolymers and syndiotactic polypropylene homopolymers blended with one or more of said other homopolymers. Although, the specific composition of the core does not constitute a limitation on the broadest aspects of this invention, the core needs to have a melting point higher than the hologram-receiving skin layer.

In all embodiments of the invention the film includes in excess of 115 gloss units, prior to metallization, as determined by ASTMD2457-97 at an angle of 20°. More preferably the film includes at least about 135 gloss units, prior to metallization, as measured by ASTMD2457-97 at an angle of 20°.

DETAILED DESCRIPTION OF THE PREFERRED EMBODIMENTS

Although holographic transfer films (i.e., films employed to impart a holographic image to a subsequently applied metallized layer that thereafter is transferred to another substrate) are within the scope of the broadest aspects of this invention, the disclosure that follows is directed to holographic films of this invention in which a metal layer that conforms to the embossed pattern in the film remains a permanent part of that film to form a composite substrate having a variety of different uses, e.g., gift wrapping paper, flexible food packing applications and as a decorative component in non-flexible packages or rigid packages.

The preferred films of this invention are biaxially oriented three-layer products; preferably formed by a conventional co-extrusion process, employing either bubble or tenter forming equipment. However, within the broadest aspects of this invention the film can include more than three-layers and may be either cast or uniaxially oriented. The core layer, which is the thickest layer, most preferably is a Ziegler-Natta catalyzed or metallocene catalyzed isotactic polypropylene homopolymer, although the use of a polypropylene copolymer (either Ziegler-Natta catalyzed or metallocene catalyzed), either by itself or in conjunction with a polypropylene homopolymer is within the scope of the broadest aspects of this invention.

Throughout this specification, unless otherwise indicated, the term "polypropylene" means a Ziegler-Natta catalyzed or metallocene catalyzed crystalline or semi-crystalline (e.g., isotactic) homopolymer of propylene or a copolymer of propylene with another olefin in an amount insufficient to change the crystalline nature of the polypropylene significantly or to change the properties that make polypropylene a desirable packaging material. Typically, this other olefin will be ethylene in an amount not exceeding about 1% by weight.

However, as stated above, it is within the scope of the broadest aspects of this invention to form the core with a propylene-ethylene copolymer including greater than 1% ethylene, by weight, as well as with blends of polypropylene and a propylene-ethylene copolymer. In accordance with the broadest aspects of this invention the core can be of any acceptable thickness, with the thickness preferably being in the range of 40 to 200 gauge; more preferably in the range of 60 to 120 gauge, even more preferably in the range of 65 to 80 gauge, and in an exemplary film of this invention, approximately 68.5 gauge. (3.95 gauge=1 micron).

The films of this invention include an outer layer for receiving the etched, i.e., embossed, holographic image therein. Applicant has found that this layer should have certain very important properties in order to both receive and retain the holographic image therein, and also to provide the desired visual appearance, e.g., brightness and sharpness of image, in the metallized, packaging film. Specifically, in addition to being capable of receiving and retaining a sharp, embossed pattern therein, the outer layer of the film, prior to metallization, must have a sufficiently high gloss, low haze and degree of clarity to make the film suitable for its intended use. All references to "gloss, "haze," and "clarity" in describing this invention is with reference to the non-metallized film.

Applicant has determined that the high gloss of the hologram-receiving outer layer in the films of this invention translates to a level of brilliance (i.e., brightness) and sharpness, or crispness, of the embossed, holographic image in the metallized film that has heretofore been unattainable in holographic films employing a Ziegler-Natta catalyzed ethylene-propylene random copolymer hologram-receiving layer.

It should be noted that the melting point of the copolymer employed to receive the holographic image therein is critical, in that it defines the temperature range of embossability. Too high a melting point results in a film surface that will not take (i.e., retain) a sharp embossed image therein. Too low a melting point results in a surface that will stick to the embossing roll, thereby adversely affecting processability and the quality of the embossed image.

Another important feature of this invention is the thickness of the outer layer that receives the holographic image therein. In particular, the thickness should be at least as thick, and preferably thicker than the depth of the hologram that is embossed into the surface. In a preferred form of the invention, the holographic image is impressed into the outer layer by first preheating the film and then directing the film through an embossing, or patterning nip provided between a smooth-surfaced rubber back-up roll and a cooled, metal or metal/epoxy roll having the desired holographic image etched into it. In a preferred form of the invention the etched pattern is in the form of impressions that are in the range of approximately 0.2 to approximately 1.5 microns deep and these impressions are spaced apart from each other approximately 1 micron. In the more preferred embodiments of the invention the thickness of the outer layer that receives the embossed pattern therein should be at least 2 gauge; more preferably in the range of 2–8 gauge; still more preferably in the range of 4 to 8 gauge; still more preferably in the range of 5 to 8 gauge; still more preferably in excess of 6 gauge and most preferably approximately 6.5 gauge. Transparent holographic films within the scope of this invention, without a metallized layer thereon, should have a gloss in excess of 115 gloss units, more preferably in excess of 120 gloss units, and most preferably about 135 gloss units or greater, with the most preferred range being 135 to 140 gloss units, as measured by ASTM D2457-97 at a 20° angle. Moreover, transparent holographic films within the scope of this invention, without a metallized layer thereon, should desirably have a haze value of 3% or less, and more preferably 2% or less, as determined by the Gardner Haze Meter.

In accordance with the most preferred embodiments of this invention, applicant has determined that a very desirable polymer composition for the outer layer that is to receive the embossed holographic image therein is a butene-propylene random copolymer including a percentage, by weight, of butene therein effective to provide the butene-propylene random copolymer with a melting point in the range of between about 125° C. and about 145° C. Typically, the butene-propylene random copolymer will contain 16% by weight butene or less, but preferably not less than about 8%, with a more preferred range being in excess of 8% to about 14%. One of the most preferred random copolymers in accordance with this invention contains about 14% by weight butene and has a melting point of approximately 131° C. and a MFR of 5.7–7.3. Such a preferred polymer is commercially produced by Union-Carbide and is designated DS4.D05.

It should be noted that all references to the melting point in this application refer to the DSC melting point.

It also should be noted that although the butene-propylene random copolymer preferably includes 16% or less, by weight, butene, it is believed that a butene-propylene random copolymer including 5% or less butene will have too high a melting point to receive and retain a crisp, embossed pattern therein. It is believed that the most preferred butene-propylene copolymers should have a percentage of butene, by weight, in excess of 5%, and more preferably in excess of 8%. Excellent results have been achieved with a butene-propylene random copolymer having 12.5% butene; commercially produced by Union Carbide under the designation SRD4-190.

The hologram-receiving layer can include 100%, by weight, of the butene-propylene random copolymers identified above. However, as will be pointed out in greater detail below, the butene-propylene copolymer can be included in a substantially lower weight percentage, e.g., approximately 50% or 25%, when it is blended with one or more additional, suitable polymers.

In accordance with another aspect of this invention the hologram-receiving layer can include a metallocene-catalyzed, ethylene/propylene random copolymer; preferably isotactic (miC3/C2 copolymer). The metallocene-catalyzed isotactic copolymer preferably includes at least 2% ethylene, by weight, of the copolymer and most preferably between 2% and 7% by weight. The hologram-receiving layer can include the metallocene-catalyzed, isotactic ethylene/propylene random copolymer by itself (i.e., 100%, by weight, of the polymer composition) or in a variety of blend ratios with other polymers. For example, the hologram-receiving layer can include the miC3/C2 copolymer blended with a polypropylene homopolymer; preferably a metallocene-catalyzed isotactic polypropylene homopolymer (miC3). One such blend that has been found to be suitable for use in this invention is a 50/50 binary blend, by weight, of miC3/C2 (2%C2, by weight) copolymer and miC3 homopolymer.

Another blend found to be suitable in this invention is a binary blend of the miC3/C2 copolymer with a butene-propylene random copolymer of the type described earlier in this application. Exemplary of this latter binary blend is a 50/50 binary blend, by weight, of a miC3/C2 copolymer (2%C2) and a butene-propylene random copolymer having more than 8% butene; preferably 12.5% butene or 14% butene. In addition, the miC3/C2 copolymer can be part of a tertiary blend with miC3 homopolymer and the butene-propylene random copolymers described earlier in this application. One such tertiary blend that has been found to be suitable for use in this invention is a 50/25/25 blend, by weight, of miC3 homopolymer, miC3/C2(2%C2) copolymer and a butene-propylene random copolymer (14% butene, by weight), respectively.

Table 1, which follows, shows the polymer composition of the holographic-receiving surfaces in eight different, two layer film constructions. In all cases the second, or core layer was a Ziegler-Natta catalyzed isotactic polypropylene (Fina 3371). The total film thickness was approximately 75 gauge, with the thickness of the holographic-receiving layer being approximately 5 gauge.

Table 2, which follows, shows the haze, gloss and seal initiation properties of the eight films identified in Table 1. The seal initiation temperature is the seal temperature which yields a peak strength value of 200 gms/in or greater (usually a function of DSC melt point).

TABLE 2

Embossability, Optics and Seal Initiation Results

| Formula | % Haze | 20 deg Gloss | S.I.T. (F.) | Embossability Rating*,** | | |
|---|---|---|---|---|---|---|
| | | | | 266 F. | 284 F. | 303 F. |
| -1 miPP (homo) | 0.3 | 143 | >>250 | 0 | 0 | 0 |
| -2 miPP (copolymer) | 2.5 | 121 | >250 | 0 | 2 | 4 |
| -3 Control 14% C4 | 2.5 | 124 | <230 | 2 to 3 | 4 | 4 |
| -4 PP-butene 12.5% C4 | 1.3 | 126 | <230 | 2 | 4 | 4 |
| -5 50/50 [-1/-2] | 1.3 | 128 | >250 | 0 | 1 to 2 | 4 |
| -6 50/50 [-1/-3] | 1.5 | 127 | 245 | 0 | 2 to 3 | 4 |
| -7 50/25/25 [-1/-2/-3] | 1.3 | 128 | <245 | 0 | 2 to 3 | 4 |
| -8 50/50 [-2/-3] | 0.7 | 121 | 235 | 2 to 3 | 3 to 4 | 4 |

*Subjective Scale
[Visual Assessment]
0 = No embossed image
1 = Slight embossed image
2 = Moderate embossed image
3 = Good embossed image
4 = Brilliant/Sharp embossed image
5 = Sealer set up = Top Seal Jaw
Nickel shimw/
embossing image facing down embossable film surface up
Bottom Seal Jaw
**Conditions
Brugger Sealer: Top Jaw set at 266, 284 and 302 F.
Bottom Jaw set at 77 F.
Jaw Pressure set at 550 N
Hologram = commercially supplied Nickel shim
Dwell Time = 2 seconds It should be noted that although all of the gloss values are within the scope of this invention, none of the reported

TABLE 1

Developmental Holographic Receptive Surfaces Composition (wt. %)

| Ingredient | M.P. © | -1 | -2 | -3 | -4 | -5 | -6 | -7 | -8 |
|---|---|---|---|---|---|---|---|---|---|
| Fina EOD-98-09 [miPP] | 151 | 100 | 0 | 0 | 0 | 50 | 50 | 50 | 0 |
| Fina EOD-0014 (miPP 2% C2) | 138 | 0 | 100 | 0 | 0 | 50 | 0 | 25 | 50 |
| UC DS4.D05 PP-Butene 14% C4 [control resin] | 131 | 0 | 0 | 100 | 0 | 0 | 50 | 25 | 50 |
| UC SRD4-190 [PP-Butene 12.4% C4] | 135 | 0 | 0 | 0 | 100 | 0 | 0 | 0 | 0 |
| Total | | 100 | 100 | 100 | 100 | 100 | 100 | 100 | 100 |

Notes:
-1 EOD-98-09 is a proprietary metallocene catalyzed isotactic homopolymer from Fina
-2 EOD-0014 is a proprietary metallocene catalyzed ethylene propylene random copolymer from Fina values is at or above the most preferred limit of 135 gloss units. The reason for this is that an extrusion problem in making the test samples created fine streaks in the hologram-receiving surface. While these streaks are believed to have reduced the gloss of the surface, they did not adversely effect the embossability evaluation discussed hereinafter.

It should be noted that the embossability rating of the films is a subjective rating, as shown and identified in the Table 2. The embossing operation was carried out with an in-house embossing test employing an embossed nickel shim and a conventional heat sealer. The set-up and processing conditions are identified in Table 2. The in-house embossing system is believed to provide results that correlate with the results that would be obtained on a commercial line employing a rotary embossing roll.

It should be noted that the largest embossing temperature window for providing acceptable results exists with film constructions 3, 4 and 8. These latter constructions have the following hologram-receiving layers:100%, by weight, butene-propylene random copolymer having 14%, by weight, butene (film construction 3); 100%, by weight, butene-propylene random copolymer having 12.5%, by weight, butene (film construction 4) and a 50/50 blend, by weight, of miC3/C2(2%C2) copolymer and butene-propylene random copolymer having 14%, by weight, butene (film construction 8).

The most preferred film constructions were those that had a "4" embossability rating; however, film constructions with at least a "3" rating may be acceptable for commercial product. It is possible, however, that a film construction having a "4" or "3" embossability rating based on the laboratory test procedure employed herein might not provide an acceptable product on commercial equipment.

Additional tests were conducted on two different types of two layer film constructions. One type had a total thickness of approximately 74 gauge, with the core layer being standard Ziegler-Natta catalyzed, isotactic polypropylene homopolymer having a thickness of approximately 70 gauge and a hologram-receiving skin layer of approximately 4 gauge, which was corona treated to improve surface adhesion characteristics. The other type included the same core, but the hologram-receiving layer was approximately 8–10 gauge and was not corona treated. The polymers employed and tested for embossability in the hologram-receiving layers were high density polyethylene, a C2C3 block copolymer, styrene-butadiene copolymers, a high density polyethylene blended with a HDPE/polyisobutylene (PIB) preblend, in equal amounts (i.e., 50/50, by weight), an ethylene-propylene-diene monomer (EPDM) terpolymer rubber, a ethylene-propylene thermoplastic olefin (TPO) and a conventional ethylene-propylene random copolymer.

Table 3, which follows, shows the specific skin layer compositions in 14 two layer film constructions that were tested.

TABLE 3

Skin Layer Compositions Tested for Embossability
Composition (wt %)

| Ingredient | A | B/C[1] | D/E[1] | F | G | H/I[1] | J/K[1] | L/M[1] | N |
|---|---|---|---|---|---|---|---|---|---|
| FINA 7208 MMW HDPE homopolymer | 0.0 | 42.5 | 42.5 | — | — | 85.0 | 42.5 | 42.5 | — |
| Montell SI-908 C2C3 (4.2% C2) Block copolymer | 85.0 | — | — | — | — | — | — | — | — |
| Phillips K-Resin Styrene-Butadiene Copolymer DK-11 | — | 42.5 | — | 85.0 | — | — | — | — | 21.0 |
| Exxon-Mobil Paxon PAX-PLUS 3204 HDPE/PIB | — | — | 42.5 | — | — | — | — | — | 64.0 |
| Fina Finaclear 530 Styrene-Butadiene copolymer [SBC] | — | — | — | — | 85.0 | — | — | — | — |
| Exxon Vistalon 1703P ethylene-propylene-diene monomer [EPDM] | — | — | — | — | — | — | 42.5 | — | — |
| Montell Adflex KS-359 P C2C3 Thermoplastic Olefin | — | — | — | — | — | — | — | 42.5 | — |
| Fina 8573[2] C2C3 random copolymer | 15.0 | 15.0 | 15.0 | 15.0 | 15.0 | 15.0 | 15.0 | 15.0 | 15.0 |

[1]) 8–10 gauge skin/non-treated
[2]) concentrates of 2$\mu$ cross-linked silicone, 4.5$\mu$ silica and glycerol-mono-stearate It should be noted that constructions C, E, I, K and M included an 8–10 gauge skin layer that was not corona treated. The remaining constructions included a 4 gauge skin layer that was corona treated. Also, the identified skin layers contained small additive concentrations carried by the Fina 8573 random copolymer, as identified in Table 3. In the opinion of the inventor, these additives (i.e., silicone and silica and glycerolmono-stearate) did not have an adverse effect on the embossablility ratings reported in Table 4, which follows.

Reference throughout this application, including the claims, to the hologram-receiving surface being "untreated" means that it is not subjected to an oxidation treatment such as corona treatment and flame treatment prior to receiving an embossed, holographic image therein.

Referring to Table 4, which follows, the embossability evaluations for the 14 two layer film constructions identified in Table 3 are identified.

TABLE 4

Embossability Evaluations

| | EMBOSSABILITY RATING[1, 2] | |
|---|---|---|
| FORMULA | 275° F. (135° C.) | 302° F. (135° C.) |
| A | 0 | 0 |
| B | 1 | 3 (sticky) |
| C | 1 | 3 (sticky) |
| D | 1 | 1–2 |
| E | 0 | 2–3 |
| F | 1 | 1–2 |
| G | 2–3 | 2–3 (sticky) |
| H | 2 | 2–3 |
| I | 0 | 4 |
| J | N/A | N/A |
| K | 0 | 4 |
| L | N/A | N/A |
| M | 1 (sticky) | 2–3 (sticky) |
| N | 0 | 1 |

[1]Subjective: Scale: 0 = No embossed image, 1 = Slight, 2 = Moderate, 3 = Good, 4 = Brilliant/Sharp embossed image
[2]Conditions: Brugger Sealer/Top Jaw at 275 F. and 302 F., Bottom Jaw at 77 F., Jaw Pressure 550 N, Dwell time 2 seconds, Hologram = commercially supplied Nickel Shim.

Based on the fact that the "3" rated products (i.e., B and C) were determined to be sticky in the laboratory test they would not be suitable for commercial product. Only samples I and K were considered acceptable. Referring to Table 3, the hologram-receiving layer of sample I included 85%, by weight, high density polyethylene homopolymer and 15%, by weight, Ziegler-Natta catalyzed C2/C3 random copolymer (Fina 8573). Most significantly the hologram-receiving surface was untreated prior to embossing. Although this samples did include 15%, by weight, of the Fina 8573 C2/C3 random copolymer, it is believed that the embossability rating was controlled by the substantially higher weight percentage (i.e., 85%) of the high density polyethylene homopolymer. Thus, it is applicant's belief that the same desired embossability rating would be achieved if the hologram-receiving layer were 100%, by weight, of a high density polyethylene homopolymer. It also is applicant's belief that the same embossability rating would have been achieved if the untreated surface were only 4 gauge, instead of 8–10 gauge.

The hologram-receiving layer of sample K, which is the other acceptable sample investigated in the testing reported in Table 4, included 42.5%, by weight, of the aforementioned high density polyethylene homopolymer, 42.5%, by weight, of the EPDM and 15%, by weight, of the Ziegler-Natta catalyzed C2/C3 random copolymer (Fina 8573). Most significantly the hologram-receiving surface was untreated prior to embossing. Although these samples also included 15%, by weight, of the Fina 8573 C2/C3 random copolymer, it is believed that the embossability rating was controlled by the substantially higher weight percentage (i.e., 85%) of the 42.5/42.5 blend of the high density polyethylene homopolymer and the EPDM. Thus, it is applicant's belief that the same desired embossability rating would be achieved if the hologram-receiving layer were a 50/50 blend of the high density polyethylene homopolymer and the EPDM. It also is applicant's belief that the same embossability rating would have been achieved if the untreated surface were only 4 gauge, instead of 8–10 gauge.

As noted earlier, the preferred films of this invention are three-layer structures. The additional layer, which is extruded onto the side of the core opposite the side that includes the hologram-receiving layer, preferably is a clear skin that does not diminish, or detract from the desired brilliance and clarity of finished, transparent metallized films in accordance with this invention. Most preferably this additional layer is oxidatively treated, e.g., by corona or flame treatment, to render the surface highly suitable for printing, laminating, and similar applications. Most preferably, the additional layer is a slip skin layer formed of a polypropylene homopolymer containing a non-migratory slip agent in it, such as a cross-linked silicone sold under the trademark Tospearl manufactured and sold by Toshiba Limited in Japan. The Tospearl cross-linked silicone spheres are approximately 2 micron in diameter, and are present in the homopolymer in an amount that preferably does not exceed 2500 parts per million (ppm), and most preferably in an amount of 1000 ppm or less. It should be understood that there are a number of non-migratory slip agents, both organic and inorganic, that can be utilized in accordance with the broadest aspects of this invention. The important property is that the slip agent be non-migratory so as not to adversely affect processability of the film.

As noted earlier herein, it is within the broadest aspects of this invention to provide the additional layer in the form of a hologram-receiving layer of the types described previously.

It is very important that the additives employed in the film of this invention be of the non-migratory type, or if they are of the migratory type, that they be present in such small quantities that they do not adversely affect the processability and/or operability of the films. Specifically, migratory agents in the film tend to plate out on the embossing roll; resulting in a degradation of the embossed image in the film. The propylene-butene polymers useable in this invention do not include excessive quantities of migratory agents that adversely effect, i.e., degrade, the embossed image in the film. In the most preferred embodiments of this invention, the embossing layer of the film is devoid of migratory agents that would cause plate out, and also are free of non-migratory agents in a quantity that would degrade the embossed image. The embossing layer of the films of this invention preferably are substantially free, and most preferably are completely free of antiblock agents, antistatic agents, slip agents, or other organic migratory components.

It is highly desirable to provide a slip layer on the side of the film opposite the hologram-receiving layer, to thereby provide a relatively slippery surface that enhances the windability of the product during the processing stages. Specifically, it is difficult to wind a film having too high a coefficient of friction, because the surfaces engaging each other in the wound product will not easily slip over one another during the winding operation. In preferred embodiments of this invention, the slip layer has a thickness of at least about 2 gauge; more preferably in the range of 2–8 gauge; more preferably in the range of 4–5 gauge and most preferably approximately 5 gauge.

It also should be noted that the polypropylene homopolymer employed in either the core or the slip skin can include a metallocene catalyzed polypropylene, high crystalline polypropylenes, C2/C23 random copolymers, isotactic polypropylenes, blends of two or more of the above, or a syndiotactic polypropylene blended with one or more of the above. A syndiotactic polypropylene tends to lower the melting point of the polymer and may possibly be usable in the butene-propylene copolymer of the hologram receiving layer. However, it is not believed that the core of the films of this invention can be formed of 100% syndiotactic polypropylene. It should be understood that the specific composition of the core does not constitute on limitation on the broadest aspects of this invention.

In the preferred embodiments of this invention, the outer layer for receiving the holographic image therein is treated, after embossing, for the purpose of enhancing the adherence of the metal layer to the film surface. In preferred embodiments of this invention, the embossed outer layer for receiving the holographic image therein is either corona-treated or flame-treated in a manner that is well known to those skilled in the art.

In use, the films of this invention are packaged in a roll form, and are then unwound and directed through a preheating station prior to being directed through an embossing nip including a rubber back-up roll and a cooled, seamless metal or metal/epoxy embossing roll with the desired holographic, etched pattern therein. The cooled embossing roll both imparts and sets the etched pattern in the film surface. After embossing, the surface of the film for receiving the holographic image thereon preferably is treated oxidatively, e.g., corona treated, to enhance metal adhesion properties of said surface. Most preferably this treatment is carried out after the embossing operation, so as to preclude the film from sticking to the embossing roll during the embossing operation. After the embossing step the embossed surface is metallized, e.g., by vacuum metallization, to thereby apply a thin metal layer that conforms to the surface of the film that includes the holographic image therein. It should be understood that the metal deposition step is carried out to provide an extremely thin metal layer having a thickness that is measured in Angstroms, as is well known to those skilled in the art. Most preferably the metal layer has a thickness in the range of approximately 100 Angstroms to approximately 500 Angstroms, and the metal employed in the film can be any of the well known metals that have been employed for this purpose, including aluminum, gold, silver, etc., with the most preferred metal being aluminum.

In the preferred embodiments of this invention, the metallized layer is permanently adhered to the holographic film to form a metallized packaging film having a highly desirable surface appearance and being characterized by a good resistance to the passage of oxygen and moisture vapor therethrough, without regard to the thickness of the film. These oxygen and moisture vapor transmission properties are particularly important for packaging or wrapping items such as candy, gum, and other food products that tend to lose freshness rapidly when exposed to air and/or moisture vapor.

It also should be noted that the metallized holographic films of this invention are very desirable for use as a decorative component in non-flexible packages or rigid packages, e.g., packages for tubes of toothpaste, cereal boxes, detergent boxes, etc. In these applications the flexible holographic films of this invention are bonded to either a semi-rigid, or rigid substrate, such as paperboard stock.

Although the preferred embodiments of this invention are holographic films with the metallized layer that conforms to the embossed pattern being a permanent component of the films, it is believed that, by the addition of suitable release additives, the films can be modified to permit transfer of the metal layer, with the embossed pattern imparted thereto, from the holographic films to a second substrate, such as a thin tissue paper, a foil substrate, a board stock, or other desired substrate. Suitable release additives are known to the trade and include components such as glycerol monostearate (GMS) and ethoxylated stearylamine. Although the types and amounts of antistatic/release additives may be varied, for the packaging of foods these additives must meet applicable FDA requirements.

Although the most preferred films of this invention are transparent, opaque films also are within the scope of the broadest aspects of this invention. As is known in the art, opaque films can include a voiding material, such as calcium carbonate, in the core to form such films. In addition, opaque films can be formed by providing a pigmented, non-voided core. Reference to "opaque film(s)" throughout this application include films that are rendered opaque by the addition of voiding additives as well as films that are rendered opaque by the inclusion of a pigment in the structure. Other than the addition of a voiding additive or pigment to the core, the opaque films of this invention can be of the same composition and construction as the transparent holographic films of this invention, as described in detail earlier herein.

Although it is believed that opaque films within the scope of this invention will have a lower gloss, lower clarity and higher haze than the transparent films of this invention, it is believed that the gloss still will be better than opaque holographic films employing a Ziegler-Natta catalyzed isotactic propylene-ethylene copolymer layer as the hologram-receiving layer. This should translate to a brighter opaque metallized holographic film with a holographic image therein that is sharper and crisper than holographic images in opaque metallized films employing the Ziegler-Natta catalyzed isotactic propylene-ethylene copolymer layer that receives the holographic image and metallized coating.

Without further elaboration, the foregoing will so fully illustrate my invention that others may, by applying current or future knowledge, readily adopt the same for use under various conditions of service.

What I claim as my invention is the following:

1. A multilayer holographic film including a first layer and a hologram-receiving layer having a lower melting point than said first layer on at least one side of the first layer for including an embossed, holographic image therein and being adapted to receive a metal layer thereon, said hologram-receiving layer comprising a butene-propylene random copolymer.

2. The film of claim 1, further including an embossed, holographic image in the hologram-receiving layer and a metal layer on the embossed hologram-receiving layer and including an image therein conforming to the embossed holographic image in said hologram-receiving layer.

3. The film of claim 1 wherein said holographic-receiving layer comprises at least about 25%, by weight, of a butene-propylene random copolymer containing more than 8%, by weight butene therein.

4. The film of claim 3, wherein said hologram-receiving layer further includes a metallocene catalyzed, isotactic C2/C3 random copolymer with a C2 content of at least about 2% blended with said butene-propylene random copolymer containing more than 8%, by weight butene therein.

5. The film of claim 4, wherein said metallocene catalyzed, isotactic C2/C3 random copolymer with a C2 content of at least about 2% constitutes approximately 50%, by weight, of the blend and said butene-propylene random copolymer containing more than 8%, by weight butene therein constitutes approximately 50%, by weight of the blend.

6. The film of claim 4, wherein said hologram-receiving layer further includes a metallocene catalyzed, isotactic C3 homopolymer blended with said metallocene catalyzed, isotactic C2/C3 random copolymer with a C2 content of at least about 2% and with said butene-propylene random copolymer containing more than 8%, by weight butene therein.

7. The film of claim 6, wherein said metallocene catalyzed, isotactic C3 homopolymer constitutes approximately 50%, by weight, of the blend, said metallocene catalyzed, isotactic C2/C3 random copolymer with a C2 content of at least about 2% constitutes approximately 25%, by weight of the blend and said butene-propylene random copolymer containing more than 8%, by weight butene therein constituting approximately 25%, by weight of the blend.

8. The film of claim 3, wherein said hologram-receiving layer further includes a metallocene catalyzed, isotactic C3 homopolymer blended with said butene-propylene random copolymer containing more than 8%, by weight butene therein.

9. The film of claim 8, wherein said metallocene catalyzed, isotactic C3 homopolymer constitutes approximately 50%, by weight, of the blend and said butene-propylene random copolymer containing more than 8%, by weight butene therein constitutes approximately 50%, by weight of the blend.

10. The film of claim 1 wherein said hologram-receiving layer comprises at least about 50%, by weight, of a butene-propylene random copolymer containing more than 8%, by weight butene therein.

11. The film of claim 1 wherein said hologram-receiving layer comprises substantially 100%, by weight, of a butene-propylene random copolymer containing more than 8%, by weight butene therein.

12. The film of claim 1, wherein the percentage of butene, by weight, is in the range of about 8% to about 16%.

13. The film of claim 1, wherein the percentage of butene, by weight, is about 14%.

14. The film of claim 1, including an embossed, holographic image in the hologram-receiving layer, the thickness of said hologram-receiving layer being greater than the depth of said embossed holographic image.

15. The film of claim 1, wherein the thickness of the hologram-receiving layer is at least about 2 gauge.

16. The film of claim 1, wherein the thickness of the hologram receiving layer is in the range of about 2 gauge to about 8 gauge.

17. The film of claim 1, wherein the thickness of the hologram-receiving layer is in the range of 4 gauge to 8 gauge.

18. The film of claim 1, wherein the thickness of the hologram-receiving layer is approximately 6.5 gauge.

19. The film of claim 1, wherein said at least one hologram-receiving layer is adhered to said first layer.

20. The film of claim 1, including an embossed, holographic image in the hologram-receiving layer, the thickness of said hologram-receiving layer being greater than the depth of said embossed holographic image.

21. The film of claim 1, wherein said at least one hologram-receiving layer is adhered to said first layer.

22. The film of claim 1, including a slip layer adhered to the surface of the first layer opposite the surface to which the hologram-receiving layer is attached.

23. The film of claim 22, wherein said slip layer is oxidatively treated.

24. The film of claim 23, wherein said slip layer is corona treated.

25. The film of claim 23, wherein said slip layer is flame treated.

26. The film of claim 22, wherein the slip layer includes predominantly a polypropylene homopolymer and a substantially non-migratory slip agent in said homopolymer.

27. The film of claim 26, wherein the slip agent is a cross-lined silicone present in an amount of no more than 2500 ppm.

28. The film according to claim 1, wherein said film is substantially free of migratory ingredients.

29. The film according to claim 1, wherein said hologram-receiving layer is substantially free of additives that degrade the embossed, holographic image.

30. The film according to claim 1, wherein the first layer includes polypropylene selected form the group of metallocene catalyzed isotactic polypropylene homopolymers, Ziegler-Natta catalyzed isotactic polypropylene homopolymers, high crystalline polypropylene homopolymers, Ziegler-Natta and metallocene catalyzed propylene/ethylene random copolymers, blends of two or more said homopolymers and syndiotactic polypropylene homopolymers blended with one or more of said other homopolymers.

31. The film of claim 1, including in excess of 115 gloss units, prior to metallization, as determined by ASTMD2457-97 at an angle of 20°.

32. The film of claim 1, having at least about 135 gloss units, prior to metallization, as measured by ASTMD2457-97 at an angle of 20°.

* * * * *